United States Patent [19]

Hermens

[11] Patent Number: 4,678,918

[45] Date of Patent: Jul. 7, 1987

[54] INTEGRATED RADIATION DETECTOR

[75] Inventor: Joannes L. G. Hermens, Eindhoven, Netherlands

[73] Assignee: U.S. Philips Corporation, New York, N.Y.

[21] Appl. No.: 776,329

[22] Filed: Sep. 16, 1985

[30] Foreign Application Priority Data

Sep. 26, 1984 [NL] Netherlands ........................ 8402927

[51] Int. Cl.[4] .............................................. G01T 1/185

[52] U.S. Cl. .................................... 250/374; 250/385; 313/93; 313/297

[58] Field of Search ................ 250/374, 385; 313/296, 313/297, 147, 237, 93, 536; 540

[56] References Cited

U.S. PATENT DOCUMENTS 4,491,734 1/1985 Yamaguchi et al. ................ 250/374

*Primary Examiner*—Carolyn E. Fields

*Attorney, Agent, or Firm*—Paul R. Miller

[57] ABSTRACT

An integrated radiation detector comprises a number of electrode plates assembled at a mutual distance. The electrode plates comprise slots in which electrically insulating gas-tight strips projecting through all the electrode plates are provided, of which strips one serves as an input window and the remaining strips serve as walls of the detection spaces. For sealing, the strips are interconnected, for example, by means of electrically insulated glued joints. Since the detector need no longer be assembled in a gas-tight housing, connections for the electrodes can be realized in a simple manner. Parts of the electrodes projecting beyond the actual detection space on the side of the input window may serve a collimator for the incident radiation.

18 Claims, 3 Drawing Figures

INTEGRATED RADIATION DETECTOR

The invention relates to an integrated radiation detector having a detection space which is divided into detector chambers by a number of electrode plates mounted at a mutual distance.

Such a radiation detector in the form of a gas ionization X-ray detector for an X-ray scanning apparatus is known from Netherlands Patent Application No. 8105349 laid open to public inspection.

For maintaining a comparatively high gas pressure, for example of xenon gas, in the detection space, the known detector is enclosed by a gas-tight housing. The comparatively high gas pressure in the detection space desired for good detection properties restricts the choice in regard to the window material and the thickness of the window in connection with undesired deformations of the input window. The leading of signal wires through the gas-tight wall of the housing may give rise to undesired gas leaks and electrical disturbances.

It is the object of the invention to provide a radiation detector having such a construction that a gas-tight housing around the whole detector is superfluous and the restriction in regard to the material and the thickness of the window is removed for the greater part.

According to the invention, an integrated radiation detector of the type mentioned in the opening paragraph is characterized in that the electrodes comprise slots in which electrically insulating gas-tight strips extending through all the electrode plates are provided, one of the strips constituting an input window and the remaining strips constituting walls of the detection space, with the strips, together with gas-tight connections between each pair of adjacent electrode plates and the facing edges of the strips, enclosing the detection space.

Since the electrode plates and strips collectively constitute structural components of the detector space, a housing around the detector elements has become superfluous. In fact, as a result of this construction, the pressure on the input window and the wall is borne by all electrode plates and the required gas tightness is obtained by the gas-tight connections between the strips and the electrode plates.

In a preferred embodiment the gas-tight connections are formed by glued joints, in particular by glued-in intermediate members.

in a further preferred embodiment, the electrode plates include holes and are assembled at a desired mutual distance by means of spacing members fitting in the holes. The parts of the electrode plates projecting beyond the actual detector space also form, on the side of the input window, a collimator for incident radiation and constitute electrical connections preferably on the wall situated opposite to the input window. For an optimum detection, the input window consists of a material having a low radiation absorption, for example, insulated aluminium or carbon fiber. The spacing members have different thicknesses for the formation of radially directed detector chambers.

In a further preferred embodiment the electrode plates are assembled between two non-deformable supports which do not cover the input window, with the supports being impervious to (stray) radiation. The radiation detector furthermore comprises end plates which are of a heavy construction so as to prevent bending as a result of pressure difference between the detector chamber and outer pressure.

An embodiment of a radiation detector according to the invention will be described in greater detail with reference to the accompanying drawing, in which.

Figure 1:
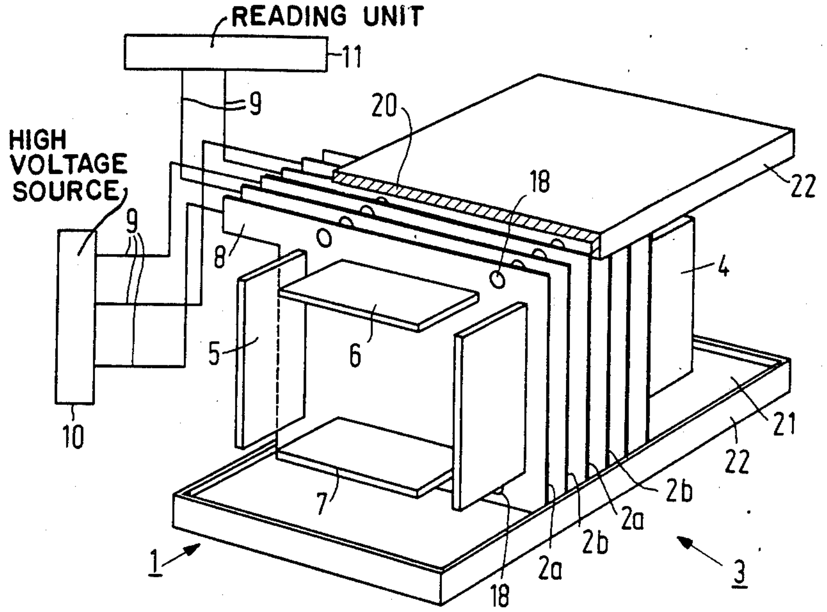
FIG. 1 shows a detector according to the invention suitable for use in an X-ray scanner.

A detector 1 as shown in FIG. 1 comprises a series of electrode plates 2*a* and 2*b*, an input window 4 which is pervious to radiation 3 to be detected, a rear wall 5, and two side walls 6 and 7. The detector is filled with a gas, for example xenon gas, at a pressure of 20 bars with which the radiation 3 to be detected, for example X-ray radiation, enters into exchange reaction after passing the input window 4. As a result of this, photoelectrons and ions are formed which flow to the anode plates 2*a* and cathode plates 2*b*, respectively, under the influence of an electric field between each pair of electrode plates. The above-mentioned electric field is generated by keeping the anode plates 2*a* at a positive high-voltage (for example, +10 kV) via electric connections at the projecting parts 8 and connections 9 by means of a high voltage source 10. The individual signals of the cathode plates 2*b* can be read by means of a reading unit 11. It is also possible to read signals of the anode plates, in which case the anode plates must be kept at a negative high-voltage (for example, −10 kV). A detector chamber 23 is formed between two electrode plates.

Figure 2:
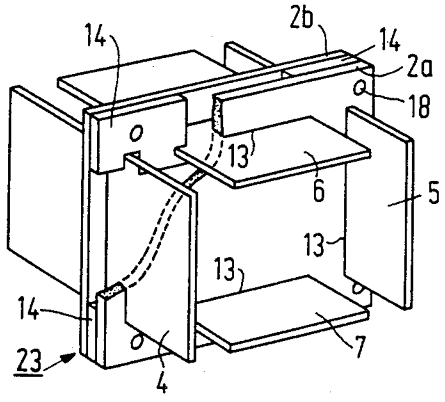
FIG. 2 shows a detector chamber of such a detector.

A detector chamber 23, as shown in FIG. 2, comprises two electrode plates 2*a* and 2*b* which are assembled at a mutual distance, for example, by means of spacers, and which comprise along the four sides slots 13 in which an electrically insulating gas-tight input window 4 which is permeable to the radiation 3 to be detected and electrically insulating gas-tight walls 5, 6, 7 are incorporated. Gas-tight glued joints 14 to be provided from without are present between each pair of electrode plates 2*a* and 2*b* and strips 4, 5, 6, 7.

Figure 3:
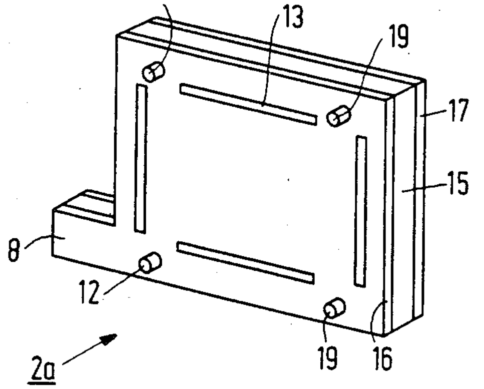
FIG. 3 shows an electrode plate for such a detector.

As shown in FIG. 3, anodes 2*a* and cathodes 2*b* preferably have the shape of laminated plates, for example, an insulating substrate which is coated on two sides with molybdenum and has a thickness of, for example, 0.35 μm. Anodes 2*a* and cathodes 2*b* are composed of a support 15, a first signal plate 16 and a second signal plate 17. Spacers 12 and 19 which are provided in holes 18 of the electrodes are present between the electrodes 2*a* and 2*b*. Each of the electrodes for the assembling of the detector 1 forms one assembly with the spacers 12 and 19 provided in the holes 18. In the case of radially directed detector chambers, as is conventional for X-ray scanners, the thickness of the spacers 12 placed in the holes is different from the thickness of spacers 19 placed in the holes. The mutual difference in thickness then is decisive of the radius of curvature of a detector thus formed.

In the embodiment shown in FIG. 2 the electrode plates 2*a* and 2*b* on the side of the input window 4 of the detector extend over such a distance that a collimator for the incident radiation 3 is formed therewith. In a corresponding manner, continuous parts of the electrode plates on the rear side of the detector may be used for electric connections. The great advantage is that the connections 9 need no longer pass through a vacuum wall. The end (electrode) plates present on each side of the detector 1 have a weighted construction to compensate for the pressure differential between detector chamber pressure and atmospheric pressure. The electrode plates 2*a* and 2*b* are preferably incorporated between two supports 20 and 21. The supports serve to increase the rigidity of the detector as a whole, to absorb incident (stray) radiation for which purpose the supports are provided with roofs 22 on the input side of the detector, and for assembling the detector in, for example, an X-ray scanner.

What is claimed is:

1. An integrated radiation detector having a detection space which is divided into detector chambers by a number of electrode plates mounted at a mutual distance, characterized in that the electrode plates comprise slots in which electrically insulating gas-tight strips extending through all electrode plates are provided, one of said strips constituting an input window and the remaining strips constituting walls of the detection space, said strips, together with gas-tight connections between each pair of adjacent electrode plates and the facing edges of the strips, enclosing the detection space.

2. An integrated radiation detector as claimed in claim 1, characterized in that the gas-tight connections are formed by glued joints.

3. An integrated radiation detector as claimed in claim 1, characterized in that the gas-tight connections are formed by glued-in intermediate members.

4. An integrated radiation detector as claimed in claim 1, 2, or 3, characterized in that electrical connections are provided on parts of the electrode plates projecting beyond the detection space.

5. An integrated radiation detector as claimed in claim 1, 2, or 3, characterized in that the input window consists of a material having a low radiation absorption for the radiation to be detected, said material being insulated aluminium or carbon fiber.

6. An integrated radiation detector as claimed in claim 1, 2, or 3, characterized in that on the wall situated opposite to the input window parts projecting beyond the detection space constitute the electric connections of the electrode plates.

7. An integrated radiation detector as claimed in claim 1, 2 or 3, characterized in that the electrode plates are assembled between two non-deformable radiation-absorbing supports which do not cover the input window.

8. An integrated radiation detector as claimed in claim 1, 2, or 3, characterized in that the detector comprises end plates which have a weighted construction.

9. An integrated radiation detector as claimed in claim 1, 2 or 3, characterized in that the electrode plates comprise holse and are assembled at a desired mutual distance by means of spacing members fitting in said holes.

10. An integrated radiation detector as claimed in claim 9, characterized in that the spacing members have different thicknesses to form radially directed detector chambers.

11. An integrated radiation detector as claimed in claim 10, characterized in that on the side of the input window, parts of the electrodes projecting beyond the detection space form a collimator for incident radiation.

12. An integrated radiation detector as claimed in claim 9, characterized in that electrical connections are provided on parts of the electrode plates projecting beyond the detection space.

13. An integrated radiation detector as claimed in claim 12, characterized in that the input window consists of a material having a low radiation absorption for the radiation to be detected, said material being insulated aluminum or carbon fiber.

14. An integrated radiation detector as claimed in claim 13, characterized in that the spacing members have different thicknesses to form radially directed chambers.

15. An integrated radiation detector as claimed in claim 14, characterized in that on the side of the input window, parts of the electrodes projecting beyond the detection space form a collimator for incident radiation.

16. An integrated radiation detector as claimed in claim 9, characterized in that the input window consists of a material having a low radiation absorption for the radiation to be detected, said material being insulated aluminum or carbon fiber.

17. An integrated radiation detector as claimed in claim 16, characterized in that the spacing members have different thicknesses to form radially directed detector chambers.

18. An integrated radiation detector as claimed in claim 17, characterized in that on the side of the input window, parts of the electrodes projecting beyond the detection space form a collimator for incident radiation.

* * * * *